United States Patent
Zheng

(10) Patent No.: US 7,706,776 B2
(45) Date of Patent: Apr. 27, 2010

(54) SCHEME FOR MAC ADDRESS PRIVACY IN INFRASTRUCTURE-BASED MULTI-HOP WIRELESS NETWORKS

(75) Inventor: Heyun Zheng, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 1007 days.

(21) Appl. No.: 11/003,368

(22) Filed: Dec. 6, 2004

(65) Prior Publication Data
US 2006/0120317 A1 Jun. 8, 2006

(51) Int. Cl.
*H04M 1/66* (2006.01)
(52) U.S. Cl. .................... 455/410; 455/7; 455/41.2; 455/518; 370/315
(58) Field of Classification Search ............ 455/41.2, 455/518, 519, 7, 410, 411; 370/475, 315; 709/245; 726/26–30
See application file for complete search history.

(56) References Cited

U.S. PATENT DOCUMENTS

| | | | |
|---|---|---|---|
| 6,567,396 B1 | 5/2003 | Pohjanvouri et al. | |
| 6,807,165 B2 | 10/2004 | Belcea | |
| 6,873,839 B2 | 3/2005 | Stanforth | |
| 2002/0058502 A1 | 5/2002 | Stanforth | |
| 2002/0093967 A1* | 7/2002 | Perlman et al. | 370/401 |
| 2002/0181465 A1* | 12/2002 | Tsuchiya et al. | 370/392 |
| 2003/0076837 A1* | 4/2003 | Whitehill et al. | 370/395.4 |
| 2003/0177267 A1* | 9/2003 | Orava et al. | 709/245 |
| 2004/0006642 A1 | 1/2004 | Jang et al. | |
| 2004/0174904 A1* | 9/2004 | Kim et al. | 370/475 |
| 2004/0240474 A1* | 12/2004 | Fan | 370/475 |

FOREIGN PATENT DOCUMENTS

WO 2004075493 A2 9/2004

OTHER PUBLICATIONS

Weniger, K.; Wireless Communications and Networking, 2003. WCNC 2003. 2003 IEEE vol. 3, 20-20 Mar. 2003 pp. 1504-1509 vol. 3.*
PCT/US0543168, "PCT Search and Written Report," Mailed Nov. 7, 2006, 7 pages.
KIPO, "Notice of Preliminary Rejection," (English Translation) KORS Application No. 10-2007-7012717, mailed Dec. 15, 2008.

* cited by examiner

*Primary Examiner*—Raymond S Dean
(74) *Attorney, Agent, or Firm*—Randi L. Karpinia; Joseph J. Buczynski

(57) ABSTRACT

A system and method for enhancing media access control (MAC) address privacy in a multi-hop wireless network, comprising providing at least one node which generates a temporary MAC address for itself for use in the network by at least one other node, and which ensures that the temporary MAC address is unique among other nodes in the network prior to using the temporary MAC address.

34 Claims, 4 Drawing Sheets

SCHEME FOR MAC ADDRESS PRIVACY IN INFRASTRUCTURE-BASED MULTI-HOP WIRELESS NETWORKS

BACKGROUND OF THE INVENTION

1. Field of the Invention

The present invention relates to a system and method for enhancing media access control (MAC) address privacy in a multi-hop wireless network, comprising providing at least one node which generates a temporary MAC address for itself for use in the network by at least one other node, and which ensures that the temporary MAC address is unique among other nodes in the network prior to using the temporary MAC address.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations.

More sophisticated ad-hoc networks are also being developed which, in addition to enabling mobile nodes to communicate with each other as in conventional ad-hoc networks, further enable the mobile nodes to access a fixed network and thus communicate with other types of user terminals, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

As the deployment of the wireless networks grows rapidly, the issue of identity privacy for the wireless users is becoming one of the major concerns in the context of wireless security. Currently, fixed Media Access Control (MAC) address identifiers for user mobile devices or nodes cannot be hidden with ease from eavesdroppers and other users in a wireless network, due to the fact that fixed MAC address identifiers cannot be adequately encrypted in the current security design. Consequently, if a mobile host sends packets from several locations, an eavesdropper might be able to track that node even if other packet security measures have been used.

In Universal Mobile Telephone Standard (UMTS) and Global System for Mobile Communications (GSM) cellular telephone networks, a mechanism for user identity confidentiality has been used in which a user is normally identified by a Temporary Mobile Subscriber Identity (TMSI). In this mechanism, a TMSI is assigned by a Visited Location Register (VLR), which is located at the base station. The TMSI, in this regard, has local significance only in the location or routing area in which the user is registered, and the VLR will maintain a mapping between TMSI and user's permanent International Mobile Subscriber Identity (IMSI).

A need remains, however, for mechanisms and schemes for MAC address privacy within infrastructure-based multi-hop ad-hoc wireless networks. The present invention provides such a scheme.

SUMMARY OF THE INVENTION

The present invention provides a scheme for MAC address privacy by using a temporary MAC address in an infrastructure-based multi-hop wireless network is devised.

Through use of the present invention, for example, the fixed MAC address used in a wireless mobile device can be substituted with the temporary MAC addresses, which is made known to external devices, thereby preventing exposure of the device's true identity to potential security threats. Moreover, the proposed duplicate MAC address detection lessens or eliminates the need for the network to maintain security, thereby reducing the otherwise significant network bandwidth costs.

The present invention further provides a system and method for enhancing media access control (MAC) address privacy in a multi-hop wireless network, comprising providing nodes which each (i) generate a respective temporary MAC address for itself for use in the network by the other nodes, and which (ii) ensure that the temporary MAC address is unique among nodes in the network prior to using the temporary MAC address.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
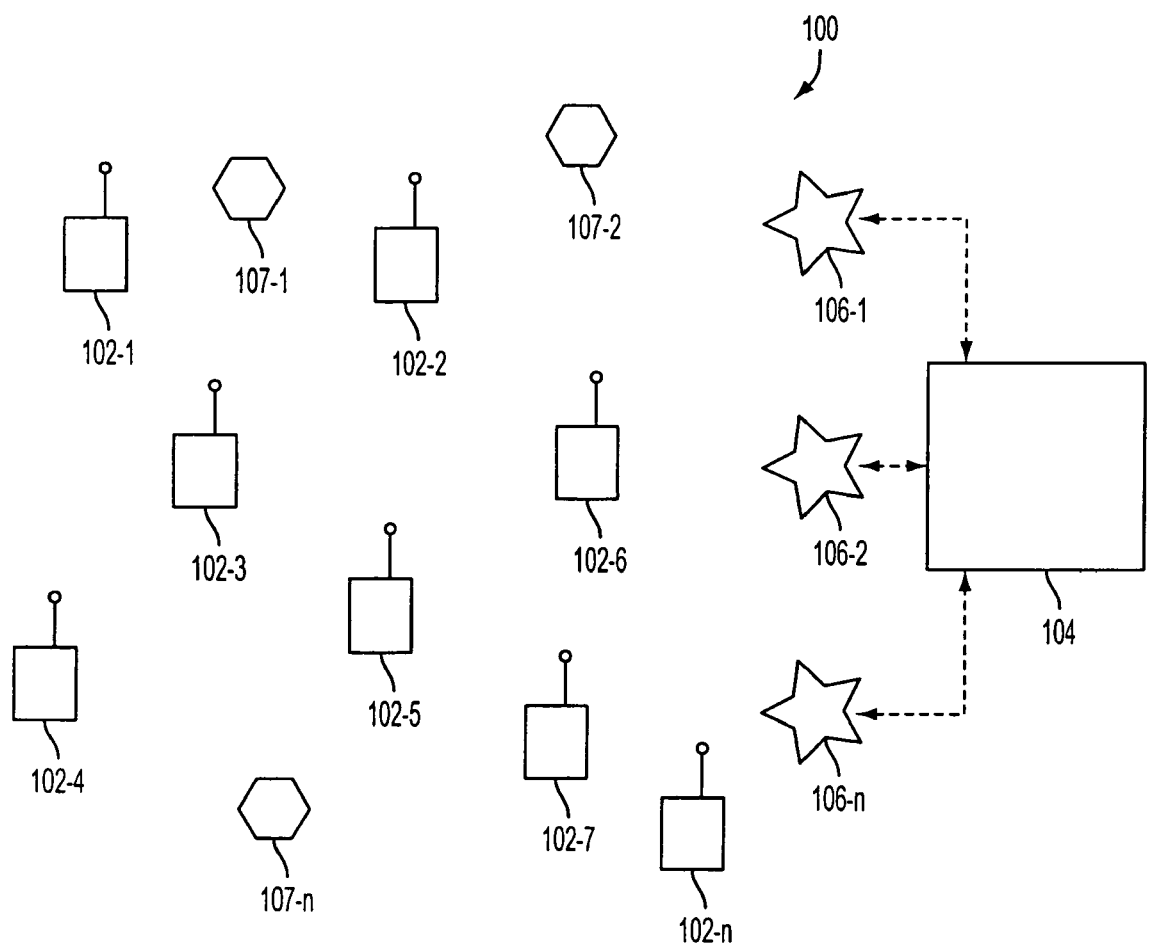
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. patent application Ser. Nos. 09/897,790, 09/815,157 and 09/815,164, referenced above.

Figure 2:
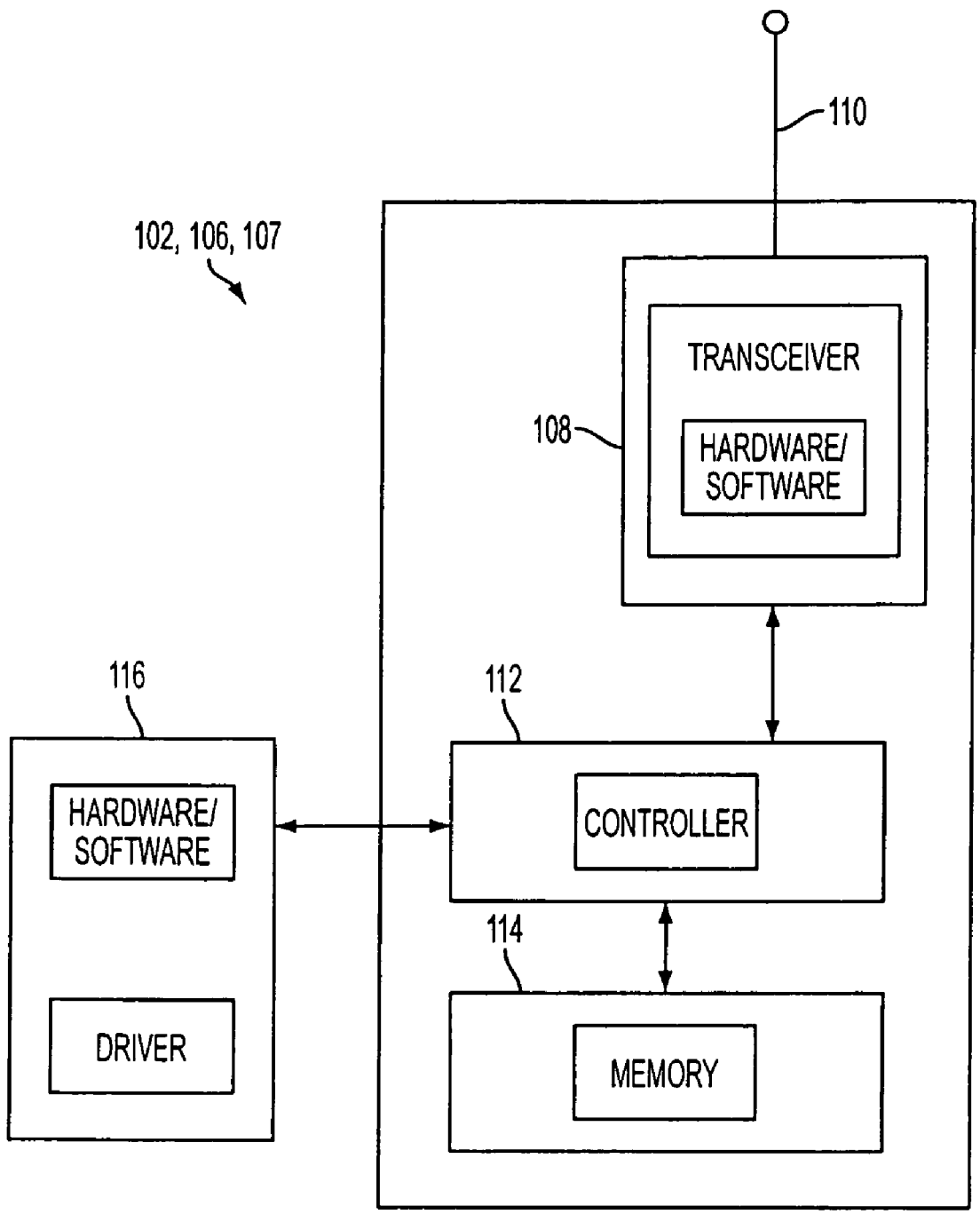
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform media access control (MAC), Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Further definitions of components of the network 100 are described as follows: an intelligent access point (IAP) is defined herein as a fixed node which communicates with meshed AP's wirelessly, as well as the wired network, and which can offer access to the wired network to the mobile wireless devices. An infrastructure-based multi-hop wireless network is defined herein as a multi-hop wireless network comprising one or more IAPs 106. An IAP association is defined herein as an association between a mobile node 102 and an IAP 106. In particular, before a mobile node 102 can access the wired network, it must first find an IAP and associate with the IAP 106. By association, the IAP 106 will have knowledge of the MAC address of the associated mobile node 102, as well as any other information that is necessary for the IAP 106 to deliver the data packets between the mobile node 102 and the devices on the wired network.

As discussed above, it is desirable for privacy aspects associated with media access control (MAC) addresses of radios or nodes 102, 106 and 107 of the network 100 to be enhanced, such that individuals can enjoy privacy while using nodes in the network. As will now be described, an embodiment of the present invention provides a system and method for enhancing media access control (MAC) address privacy in a multi-hop wireless network, comprising providing one or more nodes which (i) generate a temporary MAC address for use in the network by the one or more nodes, and which (ii) ensure that the temporary MAC address is unique among nodes in the network prior to using the temporary MAC address.

Figure 3:
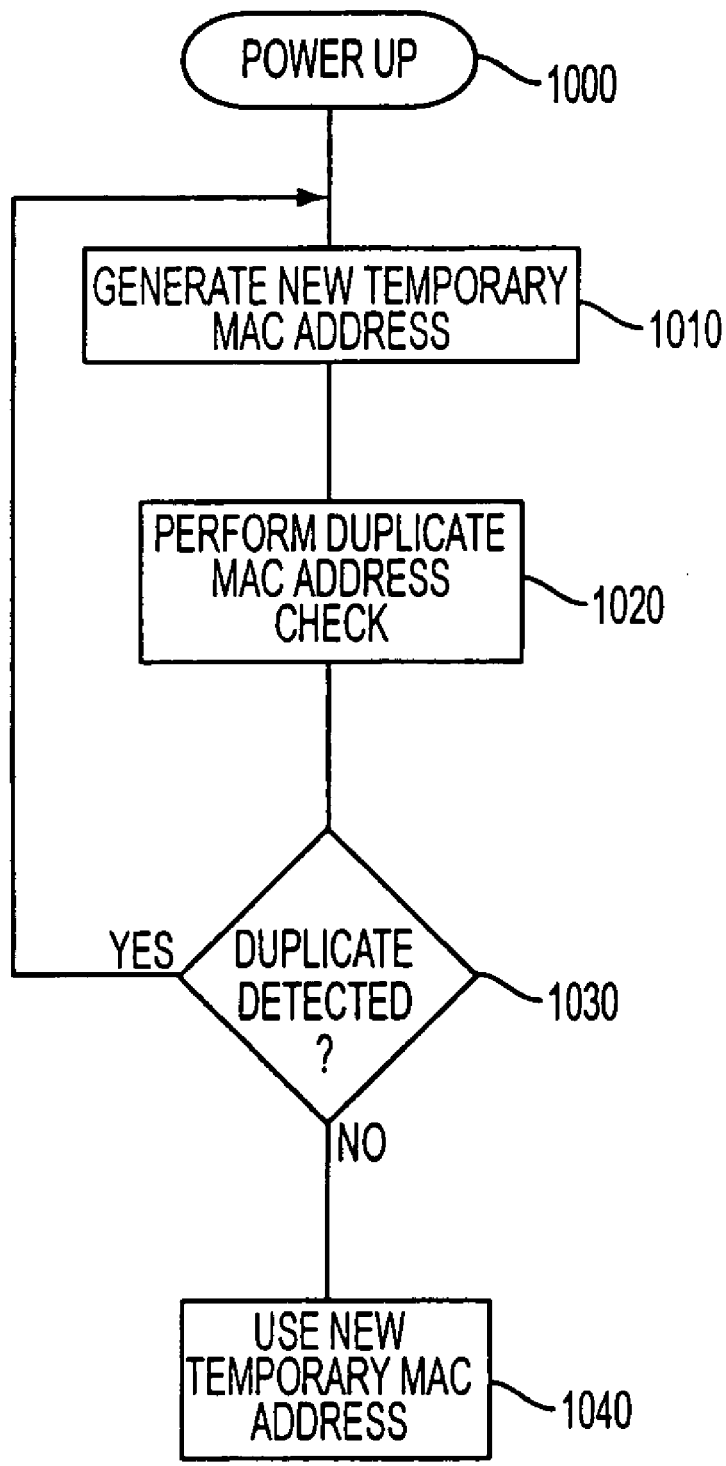
FIG. 3 is a flowchart showing an example of operations performed by a node in the network shown in FIG. 1 to generate and use a temporary MAC address, according to an embodiment of the present invention.

The system and method of the present invention preferably utilize the following approach, as shown in the flowchart of FIG. 3:

1. During power up (Step 1000) of a device such as a mobile node 102, router 107 or IAP 106, the device can generate a new temporary MAC address by feeding the fixed MAC address and a random number into a hash function in Step 1010. The temporary MAC address, in this regard, preferably is not related to the fixed MAC address of a mobile node 102 and is unique in the wireless network 100.

2. Preferably, the device then performs a subnet-wide duplicate address check in Step 1020. If a duplicate MAC address is detected in Step 1040, then the process can return to Step 1010, where another new MAC address can be selected and another subnet-wide duplicate address check can be performed. In fact, this process can be repeated until a unique MAC address is found.

3. The new temporary MAC address can then be used for either a fixed time frame or until the device is powered down.

Figure 4:
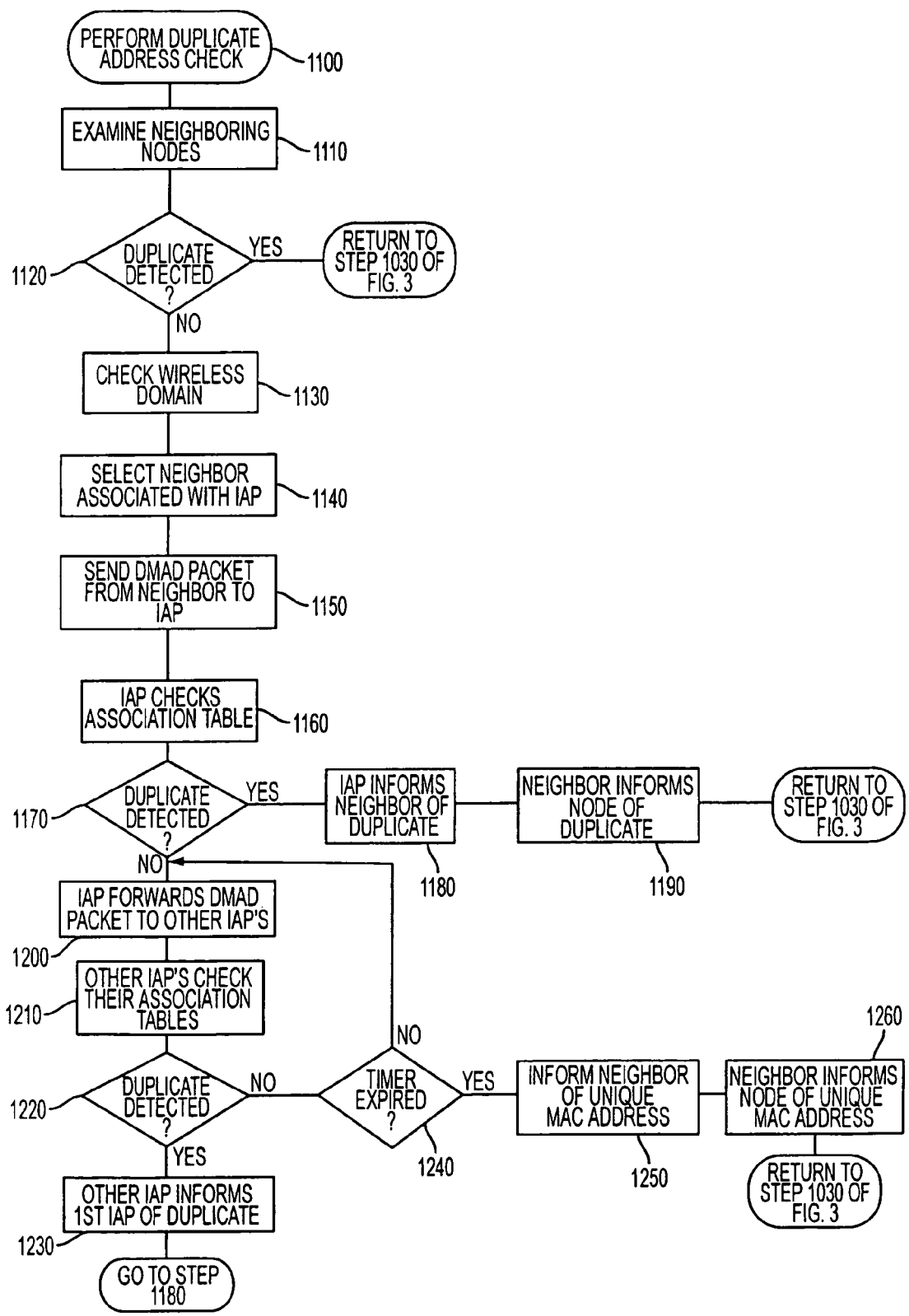
FIG. 4 is a flowchart showing an example of operations for performing a duplicate address check, according to an embodiment of the present invention.

Detection in Step 1020 of the duplicate MAC address for a new temporary MAC address of a newly-powered up mobile node 102 can be performed in any suitable manner. For example, as shown in the flowchart of FIG. 4, a newly-powered up mobile node 102 can employ the following two-step detection scheme. First in Step 1110, the mobile node 102 can examine its neighboring devices for duplicate MAC addresses. In particular, for example, when a newly powered mobile node 102 has selected a new temporary MAC address, it can check first with its neighboring devices by examining the "hello" messages from those neighbors. In this regard, if the new temporary MAC address is found to be already in use by a neighboring node in Step 1120, then the processing returns to Step 1030 in FIG. 3 and the mobile node 102 can select a different new MAC address and perform another check with its neighboring nodes, until a non duplicate temporary MAC address is obtained. After step 1120 returns a "no" decision, the device has a temporary MAC address which is at least different from its neighboring nodes. Second, the mobile node 102 can check the whole wireless domain in Step 1130 to check the uniqueness of its new temporary MAC address or substantially all nodes, including those nodes that are associated with different IAP devices in the network.

A network-wide check for duplicate MAC addresses can employ any suitable search procedure. For example, a search procedure can be conducted as follows:

(1) Since the newly-powered mobile node 102 cannot use a new temporary address prior to receiving confirmation of the uniqueness of the temporary address within the network 100, in Step 1140 the mobile node 102 can first select a neighboring node which has been associated with an IAP 106. This neighboring node can conduct the search on behalf of the newly-powered mobile node 102.

(2) In Step 1150, the selected neighboring node can then send a Duplicate MAC Address Detection (DMAD) packet from itself to an IAP 106 in a uni-cast packet, which can include the IAP address as the destination address, the sending device MAC as the source address, and the temporary MAC address to be checked.

(3) When the IAP 106 receives this DMAD packet, in Step 1160 the IAP 106 can first check its association table to see whether or not the temporary MAC address can be found in that table. If a duplicate address is found in Step 1170, then the LAP 106 can send a packet back to the DMAD packet sender and inform the sender, which informs the one or more nodes that the temporary MAC address is in use in Steps 1180 and 1190, respectively. The processing then returns to Step 1030 in FIG. 3. If the LAP 106 does not find a duplicate in its association table, then it can forward the DMAD packet to other IAP 106 devices over the wired network 100 in Step 1200. A waiting timer can be set up for the returned negative packets.

(4) In Step 1210, the other IAPs 106 that receive the DMAD packet can then check their association tables for possible duplication among other mobile devices which are associated with other IAP 106. If the temporary MAC address is found to be already in use by other mobile nodes 102, then a negative response can be sent back to the first IAP 106 in Step 1220. If no duplicate address is found, then no response will be needed to send back.

(5) The first IAP 106 can wait in Step 1230 and allow other IAPs to continue to check these association tables in Step 1210 until the waiting timer has expired; then send back either a positive or negative reply to the original DMAD sender in Steps 1220 or 1240, respectively, based on whether or not a negative response is received from other LAP 106.

(6) When the DMAD sender receives the reply from its associated IAP device it can inform the newly-powered device in Step 1250. If a duplicate temporary MAC found, the temporary MAC device (node 102) can select another MAC address in Step 1010 and repeat the process, until a new unique MAC address is found. Then the node 102 can use this temporary MAC as indicated in Step 1040.

In another embodiment of the present invention, IAP devices can detect an event in which two or more different mobile devices choose the same MAC address and send DMAD packets to the IAP device at the same time. In this event, the following process can be added during the DMAD process:

(1) When an TAP receives a DMAD message from a proxy device, the TAP can store the event as though the new temporary MAC address in the packet is already in the association and is in use.

(2) The stored event can be removed until the device is really associated or a duplicate address is found.

(3) When an TAP receives a DMAD requesting message from other TAP devices, it can check the MAC addresses in the stored DMAD events in addition to the association tables.

When a node, such as a mobile node 103, needs to change its temporary MAC address to a new one, during the operation, the device preferably does so before all the activities are finished. In this regard, the device can proceed as if the device was just powered up. Moreover, when a device holding an IP-MAC address mapping cannot obtain the route to that MAC address anymore, then the existing IP-MAC mapping can be removed and a new IP-MAC mapping acquisition can be conducted.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A system for enhancing media access control (MAC) address privacy in a multi-hop wireless network, comprising:
   at least one node for
      generating a temporary MAC address for itself for use in the network by at least one other node, and
      performing a duplicate address check on the generated temporary MAC address by examining "hello" messages received from neighboring nodes to ensure that the temporary MAC address is unique among other nodes in the network prior to using the temporary MAC address.

2. The system of claim 1, wherein the multi-hop wireless network is a multi-hop ad-hoc wireless network.

3. The system of claim 1, wherein the at least one node generates the temporary MAC address by inputting a fixed MAC address and a random number into a hash function.

4. The system of claim 1, wherein the at least one node generates the temporary MAC address when the at least one node is powered on.

5. The system of claim 1, wherein the at least one node further utilizes the temporary MAC address for a fixed time frame.

6. The system of claim 1, wherein the at least one node performs the duplicate address check by further instructing a neighboring node that is associated with a first intelligent access point (IAP) to search on behalf of the at least one node for duplicate MAC addresses in the network.

7. The system of claim 6, wherein the neighboring node sends a duplicate MAC address detection (DMAD) packet to the first IAP.

8. The system of claim 7, wherein the first IAP searches for duplicates of the temporary MAC address generated by the at least one node in a table of MAC addresses of associated mobile devices which is maintained at the first IAP.

9. The system of claim 8, wherein the first IAP also searches for duplicates of the temporary MAC address generated by the at least one node in a list of DMAD packets previously sent to the first IAP, which is maintained at the first IAP.

10. The system of claim 9, wherein if the first IAP finds a duplicate of the temporary MAC address generated by the at least one node, then the first IAP informs the neighboring node, and the neighboring node informs the at least one node, that the temporary MAC address is already in use.

11. The system of claim 9, wherein if the first IAP finds no duplicate of the temporary MAC address generated by the at least one node, then the first IAP forwards the DMAD packet to other IAP devices over the wired network.

12. The system of claim 11, wherein the other IAP devices search for duplicates of the temporary MAC address generated by the at least one node in tables of MAC addresses of associated mobile nodes, which are maintained at the other IAP devices.

13. The system of claim 12, wherein if the other IAP devices find a duplicate of the temporary MAC address generated by the at least one node, then the other IAP devices inform the first IAP that the temporary MAC address is already in use.

14. The system of claim 13, wherein the first IAP informs the neighboring node, and the neighboring node informs the at least one node, that the temporary MAC address is already in use.

15. A method of operation of a node for enhancing media access control (MAC) address privacy in a multi-hop wireless network comprising:
    generating by the node a temporary MAC address for itself for use in the network by at least one other node; and
    performing a duplicate address check on the generated temporary MAC address by examining "hello" messages received from neighboring nodes to ensure that the temporary MAC address is unique among nodes in the network prior to using the temporary MAC address.

16. The method of claim 15, wherein the multi-hop wireless network is a multi-hop ad-hoc wireless network.

17. The method of claim 15, wherein generating by the node the temporary MAC address comprises inputting a fixed MAC address and a random number into a hash function.

18. The method of claim 15, wherein generating by the node the temporary MAC address comprises generating the temporary MAC address when the node is powered on.

19. The method of claim 15, further comprising:
    utilizing by the node the temporary MAC address for a fixed time frame.

20. The method of claim 15, wherein performing by the node the duplicate address check further comprises instructing a neighboring node that is associated with a first intelligent access point (IAP) to search on behalf of the node for duplicate MAC addresses in the network.

21. The method of claim 20, further comprising instructing the neighboring node to send a duplicate MAC address detection (DMAD) packet to the first IAP.

22. The method of claim 21, further comprising instructing the first IAP to search for duplicates of the temporary MAC address generated by the node in a table of MAC addresses of associated mobile devices which is maintained at the first IAP.

23. The method of claim 22, further comprising instructing the first IAP to also search for duplicates of the temporary MAC address generated by the node in a list of DMAD packets previously sent to the first IAP, which is maintained at the first IAP.

24. The method of claim 23, further comprising instructing the first TAP to inform the neighboring node, and the neighboring node is instructed to inform the node that the temporary MAC address is already in use, if the first IAP finds a duplicate of the temporary MAC address generated by the node.

25. The method of claim 23, further comprising instructing the first IAP to forward the DMAD packet to other IAP devices over the wired network, if the first IAP finds no duplicate of the temporary MAC address generated by the node.

26. The method of claim 25, further comprising instructing the other IAP devices to search for duplicates of the temporary MAC address generated by the node in tables of MAC addresses of associated mobile node, which are maintained at the other IAP devices.

27. The method of claim 26, further comprising instructing the other TAP devices to inform the first IAP that the temporary MAC address is already in use, if the other IAP devices find a duplicate of the temporary MAC address generated by the node.

28. The method of claim 27, further comprising instructing the first TAP to inform the neighboring node, and the neighboring node is instructed to inform the node, that the temporary MAC address is already in use.

29. A node that provides enhanced media access control (MAC) address privacy in a multi-hop wireless network, the node operating to:
    generate a temporary MAC address for use in the network, and
    perform a duplicate address check on the generated temporary MAC address by examining "hello" messages received from neighboring nodes to ensure that the temporary MAC address is unique among nodes in the network prior to using the temporary MAC address.

30. The node of claim 29, wherein the multi-hop wireless network in which the node is used is a multi-hop ad-hoc wireless network.

31. The node of claim 29, wherein the node generates the temporary MAC address by inputting a fixed MAC address and a random number into a hash function.

32. The node of claim 29, wherein the node generates the temporary MAC address when the node is powered on.

33. The node of claim 29, wherein the node further utilizes the temporary MAC address for a fixed time frame.

34. The node of claim 29, wherein the node performs the duplicate address check by further instructing a neighboring node that is associated with a first intelligent access point (IAP) to search on behalf of the node for duplicate MAC addresses in the network.

* * * * *

UNITED STATES PATENT AND TRADEMARK OFFICE
CERTIFICATE OF CORRECTION

| | | |
|---|---|---|
| PATENT NO. | : 7,706,776 B2 | Page 1 of 1 |
| APPLICATION NO. | : 11/003368 | |
| DATED | : April 27, 2010 | |
| INVENTOR(S) | : Zheng | |

It is certified that error appears in the above-identified patent and that said Letters Patent is hereby corrected as shown below:

1. In Column 2, Line 67, delete "invention;" and insert -- invention. --, therefor.
2. In Column 5, Line 11, delete "LAP" and insert -- IAP --, therefor.
3. In Column 5, Line 15, delete "LAP" and insert -- IAP --, therefor.
4. In Column 5, Line 33, delete "LAP" and insert -- IAP --, therefor.
5. In Column 5, Line 47, delete "an TAP" and insert -- an IAP --, therefor.
6. In Column 5, Line 48, delete "the TAP" and insert -- the IAP --, therefor.
7. In Column 5, Line 53, delete "an TAP" and insert -- an IAP --, therefor.
8. In Column 5, Line 54, delete "other TAP" and insert -- other IAP --, therefor.
9. In Column 7, Line 47, in Claim 24, delete "TAP" and insert -- IAP --, therefor.
10. In Column 8, Line 15, in Claim 27, delete "TAP" and insert -- IAP --, therefor.
11. In Column 8, Line 20, in Claim 28, delete "TAP" and insert -- IAP --, therefor.

Signed and Sealed this
Nineteenth Day of June, 2012

David J. Kappos
*Director of the United States Patent and Trademark Office*